US012793984B2

(12) United States Patent
Nishio et al.

(10) Patent No.: US 12,793,984 B2
(45) Date of Patent: Nov. 10, 2026

(54) CATHODE, BATTERY, AND METHOD FOR MANUFACTURING CATHODE

(71) Applicant: Panasonic Intellectual Property Management Co., Ltd., Osaka (JP)

(72) Inventors: Yusuke Nishio, Osaka (JP); Kenji Nagao, Aichi (JP); Izuru Sasaki, Kyoto (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 422 days.

(21) Appl. No.: 18/407,531

(22) Filed: Jan. 9, 2024

(65) Prior Publication Data

US 2024/0145726 A1 May 2, 2024

Related U.S. Application Data

(63) Continuation of application No. PCT/JP2022/026777, filed on Jul. 6, 2022.

(30) Foreign Application Priority Data

Jul. 27, 2021 (JP) ................................ 2021-122767

(51) Int. Cl.
*H01M 10/0562* (2010.01)
*H01M 4/62* (2006.01)
*H01M 4/02* (2006.01)

(52) U.S. Cl.
CPC ....... *H01M 4/625* (2013.01); *H01M 10/0562* (2013.01); *H01M 2004/021* (2013.01); *H01M 2004/028* (2013.01); *H01M 2300/008* (2013.01)

(58) Field of Classification Search
None
See application file for complete search history.

(56) References Cited

U.S. PATENT DOCUMENTS

2014/0193689 A1 7/2014 Takami et al.
2022/0077468 A1* 3/2022 Lee .................... H01M 4/0404

FOREIGN PATENT DOCUMENTS

JP 2010-062299 3/2010
JP 2015-076180 4/2015
WO 2013/140565 9/2013

OTHER PUBLICATIONS

International Search Report of PCT application No. PCT/JP2022/026777 dated Sep. 27, 2022.

* cited by examiner

*Primary Examiner* — Carlos Barcena
(74) *Attorney, Agent, or Firm* — Rimon P.C.

(57) ABSTRACT

A cathode includes a mixture of a cathode active material, a solid electrolyte, and a conductive material. The conductive material includes carbon black having an average particle size of less than or equal to 100 nm. When a cross-section of the cathode is observed using a scanning electron microscope, an area in which the carbon black is concentrated is found between the cathode active material and the solid electrolyte.

15 Claims, 3 Drawing Sheets

CATHODE, BATTERY, AND METHOD FOR MANUFACTURING CATHODE

BACKGROUND

1. Technical Field

The present disclosure relates to a cathode, a battery, and a method for manufacturing the cathode.

2. Description of the Related Art

Japanese Unexamined Patent Application Publication No. 2015-076180 discloses a battery having a cathode including a cathode active material and a solid electrolyte.

SUMMARY

There has been a demand in the prior art for further reduction in battery resistance.

In one general aspect, the techniques disclosed here feature a cathode including a mixture of a cathode active material, a solid electrolyte, and a conductive material, wherein the conductive material comprises carbon black having an average particle size of less than or equal to 100 nm, and wherein when a cross-section of the cathode is observed using a scanning electron microscope, an area in which the carbon black is concentrated is found between the cathode active material and the solid electrolyte.

According to the present disclosure, it is possible to achieve a reduction in battery resistance.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Findings Underlying the Present Disclosure

Figure 1:
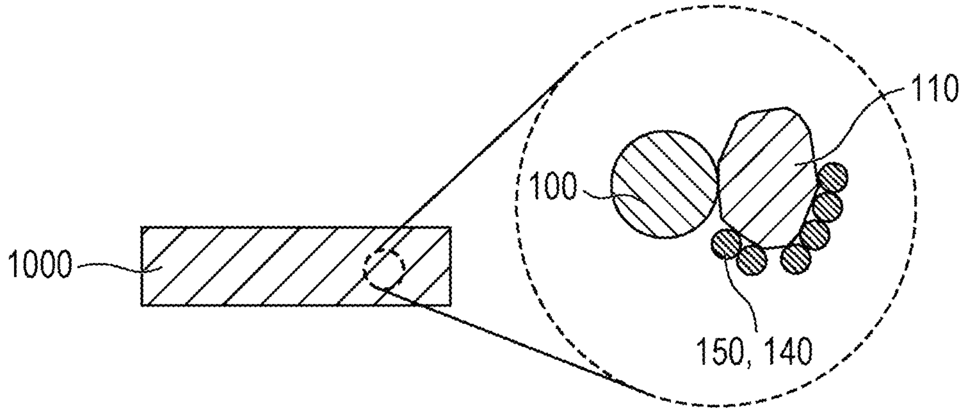
FIG. 1 is a cross-sectional diagram showing a schematic construction of a cathode according to Embodiment 1.

Japanese Unexamined Patent Application Publication No. 2015-076180 discloses a battery having a cathode including a cathode active material and a solid electrolyte. The patent document states that the cathode may include a conductive additive such as carbon black.

The present inventors, through their intensive studies on a method for reducing the resistance of an all-solid-state lithium-ion battery, found that the resistance of a battery decreases with increase in the amount of carbon black particles disposed on the surface of a cathode active material in a cathode. This is presumably because the increase in the amount of carbon black increases electron conduction paths formed on the surface of the cathode active material, leading to an increase in the effective reaction area of the cathode active material. Based on this finding, the present inventors also discovered a coverage of carbon black on the surface of a cathode active material at which conduction of lithium ions between the cathode active material and a solid electrolyte is unlikely to be inhibited in the cathode.

Summary of Aspects of the Present Disclosure

According to a first aspect of the present disclosure, a cathode includes a mixture of a cathode active material, a solid electrolyte, and a conductive material, wherein the conductive material comprises carbon black having an average particle size of less than or equal to 100 nm, and wherein when a cross-section of the cathode is observed using a scanning electron microscope, an area in which the carbon black is concentrated is found between the cathode active material and the solid electrolyte.

According to such a cathode, the effective reaction area of the cathode active material increases due to the area in which the carbon black is concentrated, located between the cathode active material and the solid electrolyte. This can reduce the resistance of the battery.

In a second aspect of the present disclosure, in one example, in the cathode according to the first aspect, x determined by the following equation (1) may satisfy $0\%<x<100\%$.

$$x=(3\cdot c)/(4\cdot a\cdot b)\times 10^5 \quad (1)$$

In Equation (1), a is a BET (Brunauer-Emmett-Teller) specific surface area ($m^2/g$) of the cathode active material, b is an average particle size (nm) of the carbon black, and c is a ratio of a mass of the carbon black to a mass of the cathode active material contained in the cathode, and a density of the carbon black is 2.0 ($g/cm^3$). Such a feature can reduce the resistance of the battery.

In a third aspect of the present disclosure, in one example, in the cathode according to the second aspect, x in Equation (1) may satisfy $5\%\leq x\leq 60\%$. Such a feature can further reduce the resistance of the battery.

In a fourth aspect of the present disclosure, in one example, in the cathode according to the second aspect, x in Equation (1) may satisfy $10\%\leq x\leq 50\%$. Such a feature can further reduce the resistance of the battery.

In a fifth aspect of the present disclosure, in one example, in the cathode according to the second aspect, x in Equation (1) may satisfy $15\%\leq x\leq 40\%$. Such a feature can further reduce the resistance of the battery.

In a sixth aspect of the present disclosure, in one example, in the cathode according to any one of the second to fifth aspects, a in Equation (1) may satisfy $0<a\leq 1.5$. Such a feature enables the carbon black to be effectively disposed on the surface of the cathode active material.

In a seventh aspect of the present disclosure, in one example, in the cathode according to any one of the first to sixth aspects, the conductive material may further comprise a fibrous carbon material. Such a feature can further increase the electron conductivity of the cathode.

In an eighth aspect of the present disclosure, in one example, in the cathode according to any one of the first to seventh aspects, the ratio of the mass of the conductive material to the mass of the cathode active material may be less than or equal to 0.03. Such a feature enables the conductive material to be unlikely to inhibit conduction of lithium ions between the cathode active material and the solid electrolyte.

In a ninth aspect of the present disclosure, in one example, in the cathode according to any one of the first to eighth aspects, the carbon black may have an average particle size of less than or equal to 25 nm. Such a feature facilitates attachment of the carbon black to the surface of the cathode active material.

In a tenth aspect of the present disclosure, in one example, in the cathode according to any one of the first to ninth aspects, the carbon black may comprise acetylene black. Such a feature can further increase the electron conductivity of the cathode.

In an eleventh aspect of the present disclosure, in one example, in the cathode according to any one of the first to tenth aspects, the solid electrolyte may comprise at least one selected from the group consisting of a sulfide solid electrolyte and a halide solid electrolyte. Such a feature can improve the output characteristics of the battery.

In a twelfth aspect of the present disclosure, in one example, in the cathode according to any one of the first to eleventh aspects, the cathode active material may have a layered rock-salt structure. In the layered rock-salt structure, transition metal atoms and lithium atoms are regularly arranged, forming a two-dimensional plane. This enables two-dimensional diffusion of lithium. Such a feature, therefore, can increase the energy density of the battery.

In a thirteenth aspect of the present disclosure, in one example, the cathode according to any one of the first to twelfth aspects may further include a coating layer which covers at least part of the surface of the cathode active material. Such a feature can further reduce the resistance of the battery.

According to a fourteenth aspect of the present disclosure, a battery includes:

- the cathode according to any one of the first to thirteenth aspects;
- an anode; and
- an electrolyte layer provided between the cathode and the anode.

According to such a battery, the effective reaction area of the cathode active material in the cathode increases. This can reduce the resistance of the battery.

In a fifteenth aspect of the present disclosure, in one example, in the battery according to the fourteenth aspect, the electrolyte layer may comprise a sulfide solid electrolyte. Such a feature can improve the output characteristics of the battery.

According to a sixteenth aspect of the present disclosure, a method for manufacturing the cathode according to any one of the first to thirteenth aspects includes:

- mixing the cathode active material and the carbon black; and
- further mixing the mixture comprising the cathode active material and the carbon black with the solid electrolyte.

Such a method can preferentially dispose the carbon black on the surface of the cathode active material. Therefore, the carbon black is likely to concentrate on the surface of the cathode active material. This makes it possible to provide a cathode in which the cathode active material has an increased effective reaction area, thus providing a battery having a reduced resistance.

Embodiments of the present disclosure will now be described with reference to the drawings.

Embodiment 1

Cathode

FIG. 1 is a cross-sectional diagram showing a schematic construction of a cathode 1000 according to Embodiment 1.

The cathode 1000 includes a mixture of a cathode active material 110, a solid electrolyte 100 and a conductive material 140. The conductive material 140 comprises carbon black 150 having an average particle size of less than or equal to 100 nm. When a cross-section of the cathode 1000 is observed using a scanning electron microscope (SEM), an area in which the carbon black 150 is concentrated is found between the cathode active material 110 and the solid electrolyte 100.

In the thus-constructed cathode 1000, electron conduction paths are likely to be formed on the surface of the cathode active material 110 due to the area in which the carbon black 150 is concentrated, located between the cathode active material 110 and the solid electrolyte 100. Therefore, the effective reaction area of the cathode active material 110 increases. This can reduce the resistance of the battery.

In the present disclosure, the observation of a cross-section of the cathode 1000 using a scanning electron microscope (SEM) is performed at a magnification of 10,000.

The average particle size of the carbon black 150 can be measured, for example, by using a transmission electron microscope (TEM) image of the carbon black 150. In particular, the average particle diameter can be determined by calculating the average value of the equivalent circle diameters of 20 randomly selected carbon black 150 particles using a TEM image.

When a cross-section of the cathode 1000 is observed using a scanning electron microscope, the area of the surface of the cathode active material 110, covered with the carbon black 150, may be larger than the area of the surface of the solid electrolyte 100, covered with the carbon black 150. Such a feature further increases the effective reaction area of the cathode active material 110.

When a cross-section of the cathode 1000 is observed using a scanning electron microscope, the carbon black 150 may be concentrated on the surface of the cathode active material 110. Such a feature further increases the effective reaction area of the cathode active material 110.

x determined by the following Equation (1) may satisfy $0\% < x < 100\%$.

$$x=(3\cdot c)/(4\cdot a\cdot b)\times 10^5 \quad (1)$$

In Equation (1), a is the BET (Brunauer-Emmett-Teller) specific surface area ($m^2/g$) of the cathode active material 110. b is the average particle size (nm) of the carbon black 150. c is the ratio of the mass of the carbon black 150 to the mass of the cathode active material 110 in the cathode 1000. The density p of the carbon black 150 is 2.0 ($g/cm^3$).

The value x determined by Equation (1) is a parameter corresponding to the coverage of the carbon black 150 on the surface of the cathode active material 110. Therefore, the above feature can reduce the resistance of the battery.

Equation (1) is derived in the following manner Assume that there are n carbon black 150 particles present per unit mass (1 g) of the cathode active material 110. When the cross-sectional area ($m^2$) per particle of the carbon black 150 is represented by a, the value x, determined by Equation (1), can be determined by dividing the total σt of the cross-sectional areas σ ($m^2$) of carbon black 150 particles per unit mass (1 g) of the cathode active material 110 by the surface areas of carbon black 150 particles per unit mass (1 g) of the cathode active material 110 (namely, the BET specific surface area a ($m^2$/g) of the cathode active material 110), and multiplying the resulting value by 100.

The total σt of the cross-sectional areas σ ($m^2$) of carbon black 150 particles per unit mass (1 g) of the cathode active material 110 is determined by the following Equation (i).

$$\sigma t=\sigma 1+\sigma 2+\sigma 3+\ldots+\sigma n=\Sigma\sigma n \quad \text{(i)}$$

In Equation (i), the cross-sectional area a ($m^2$) of the carbon black 150 is determined by the following Equation (ii) using the average particle size b (nm) of the carbon black 150.

$$\sigma=(b/2)\times(b/2)\times\pi\times10^{-18} \quad \text{(ii)}$$

In Equation (i), the number n of carbon black 150 particles per unit mass (1 g) of the cathode active material 110 is determined by the following Equation (iii) using the ratio c of the mass of the carbon black 150 to the mass of the cathode active material 110 in the cathode 1000, and using a known density p (g/$cm^3$) of the carbon black 150. v is the volume ($cm^3$) per particle of the carbon black 150.

$$n=c/(\rho\cdot v) \quad \text{(iii)}$$

In Equation (iii), the volume v ($cm^3$) of the carbon black 150 is determined by the following Equation (iv) using the average particle size b (nm) of the carbon black 150.

$$v=(4\pi/3)\times(b/2)^3\times10^{-21} \quad \text{(iv)}$$

In Equation (1), x may satisfy 5%≤x≤60%. Such a feature can further reduce the resistance of the battery.

In Equation (1), x may satisfy 10%≤x≤50%. Such a feature can further reduce the resistance of the battery.

In Equation (1), x may satisfy 15%≤x≤40%. Such a feature can further reduce the resistance of the battery.

In Equation (1), a may satisfy 0<a≤1.5. Such a feature enable the carbon black 150 to be effectively disposed on the surface of the cathode active material 110.

The ratio of the mass of the conductive material 140 to the mass of the cathode active material 110 may be less than or equal to 0.03. Such a feature enables the conductive material to be unlikely to inhibit conduction of lithium ions between the cathode active material and the solid electrolyte.

Conductive Material

While the conductive material 140 comprises the carbon black 150 as a main component, it may also comprise unavoidable impurities, or a starting material(s), a by-product(s), a decomposition product(s), etc. used in the synthesis of the carbon black 150. As used herein, the term "main component" refers to a component contained in the largest amount in terms of mass ratio.

The conductive material 140 may comprise the carbon black 150 in an amount of 100% in terms of the mass proportion to the entire conductive material 140 except unavoidable impurities.

Thus, the conductive material 140 may consist solely of the carbon black 150.

The conductive material 140 may comprise carbon black 150 having an average particle size of less than or equal to 25 nm. Such a feature facilitates attachment of the carbon black 150 to the surface of the cathode active material 110.

There is no particular limitation on the shape of the conductive material 140. The shape of the conductive material 140 may be, for example, acicular, spherical, or spheroidal.

The shape of the carbon black 150 included in the conductive material 140 may be, for example, spherical or spheroidal. The shape of the carbon black 150 may be spherical. When the carbon black 150 has a spherical or spheroidal shape, the surface of the sphere or spheroid may have irregularities.

Examples of the carbon black 150 include acetylene black, furnace black, channel black, thermal black, and Ketjen black. The carbon black 150 may comprise acetylene black, or may comprise furnace black. The carbon black 150 may comprise both acetylene black and furnace black. When the carbon black 150 comprises acetylene black, the electron conductivity of the cathode can be further increased. The carbon black 150 may be acetylene black or furnace black. The carbon black 150 may consist of acetylene black and furnace black.

Cathode Active Material

Materials which are usable as a cathode active material for an all-solid-state lithium-ion battery can be used as the cathode active material 110. Examples of the cathode active material 110 include $LiCoO_2$, $LiNi_xMe_{1-x}O_2$, $LiNi_xCo_{1-x}O_2$, $LiNi_{1/3}Co_{1/3}Mn_{1/3}O_2$, $LiMnO_2$, a hetero-element-substituted Li—Mn spinel, a lithium titanate, a lithium metal phosphate, and a transition metal oxide. In $LiNi_xMe_{1-x}O_2$, x satisfies 0.5≤x<1, and Me includes at least one selected from the group consisting of Co, Mn, and Al. In $LiNi_xCo_{1-x}O_2$, x satisfies 0<x<0.5. Examples of the hetero-element-substituted Li—Mn spinel include $LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$, and $LiMn_{1.5}Zn_{0.5}O_4$. The lithium titanate is, for example, $Li_4Ti_5O_{12}$. Examples of the lithium metal phosphate include $LiFePO_4$, $LiMnPO_4$, $LiCoPO_4$, and $LiNiPO_4$. The transition metal oxide is, for example, $V_2O_5$ or $MoO_3$.

The cathode active material 110 may be a lithium-containing composite oxide selected from $LiCoO_2$, $LiNi_xMe_{1-x}O_2$, $Li_2Co_{1-x}O_2$, $LiNi_{1/3}Co_{1/3}Mn_{1/3}O_2$, $LiMnO_2$, a hetero-element-substituted Li—Mn spinel, a lithium metal phosphate, and the like.

When the cathode active material 110 is a lithium-containing composite oxide, the cathode active material 110 may have a layered rock-salt structure. In the layered rock-salt structure, transition metal atoms and lithium atoms are regularly arranged, forming a two-dimensional plane. This enables two-dimensional diffusion of lithium. Such a feature, therefore, can increase the energy density of the battery.

Solid Electrolyte

The solid electrolyte 100 may comprise at least one selected from the group consisting of a sulfide solid electrolyte and a halide solid electrolyte. Such a feature can improve the output characteristics of the battery.

The solid electrolyte 100 may be a mixture of a sulfide solid electrolyte and a halide solid electrolyte.

Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. Sulfide solid electrolytes having an argyrodite structure, typified by $Li_6PS_5Cl$, $Li_6PS_5Br$ and $Li_6PS_5I$, can also be used. LiX, $Li_2O$, $MO_q$, $Li_pMO_q$, or the like may be added to such a sulfide solid electrolyte. Here, X is at least one selected from the group consisting of F, Cl, Br, and I. M is at least one selected from the group consisting of P, Si, Ge, B, Al, Ga, In, Fe, and Zn.

p and q are each a natural number. One or two or more sulfide solid electrolytes selected from the above materials can be used.

Such a feature can further increase the ion conductivity of the sulfide solid electrolyte, thereby further increasing the charge and discharge efficiency of the battery.

The halide solid electrolyte is represented, for example, by the following Formula (2).

$$Li_{\alpha}M_{\beta}X_{\gamma} \quad (2)$$

where α, β, and γ are each independently a value greater than zero. M includes at least one element selected from the group consisting of metal elements other than Li and metalloid elements. X includes at least one selected from the group consisting of F, Cl, Br, and I.

As used herein, the term "metalloid elements" refer to B, Si, Ge, As, Sb, and Te. The term "metal elements" refer to all the elements, except hydrogen, belonging to groups I to XII of the periodic table as well as all the elements belonging to groups XIII to XVI of the periodic table, except B, Si, Ge, As, Sb, Te, C, N, P, O, S, and Se. Thus, the term "metalloid elements" or "metal elements" refers to a group of elements which each can become a cation when forming an inorganic compound with a halogen element.

Compared to a halide solid electrolyte consisting of Li and a halogen element, such as LiI, the halide solid electrolyte represented by Formula (2) has a higher ion conductivity. Therefore, the use of the halide solid electrolyte represented by Formula (2) can further increase the ion conductivity.

In Formula (2), M may be at least one element selected from the group consisting of metal elements other than Li and metalloid elements.

In Formula (2), X may be at least one selected from the group consisting of F, Cl, Br, and I.

Formula (2) may satisfy $2.5 \le \alpha \le 3$, $1 \le \beta \le 1.1$, and $\gamma = 6$. Such a feature can further increase the ion conductivity of the halide solid electrolyte.

In Formula (2), M may include Y (=yttrium). Thus, the halide solid electrolyte may contain Y as a metal element. Such a feature can further increase the ion conductivity of the halide solid electrolyte.

The halide solid electrolyte containing Y may be, for example, a compound represented by the formula $Li_aMe_bY_cX_6$. Here, a+mb+3c=6 and c>0 are satisfied. Me is at least one element selected from the group consisting of metal elements, except Li and Y, and metalloid elements. m is the valence of the element Me. X is at least one selected from the group consisting of F, Cl, Br, and I.

Me may be, for example, at least one selected from the group consisting of Mg, Ca, Sr, Ba, Zn, Sc, Al, Ga, Bi, Zr, Hf, Ti, Sn, Ta, and Nb.

Such a feature can further increase the ion conductivity of the halide solid electrolyte.

The following materials, for example, can be used as the halide solid electrolyte. The use of such a material can further increase the ion conductivity.

The halide solid electrolyte may be a material represented by the following Formula (A1).

$$Li_{6-3d}Y_dX_6 \quad (A1)$$

In Formula (A1), X is at least one selected from the group consisting of F, Cl, Br, and I. 0<d<2 is satisfied.

The halide solid electrolyte may be a material represented by the following Formula (A2).

$$Li_3YX_6 \quad (A2)$$

In Formula (A2), X is at least one selected from the group consisting of F, Cl, Br, and I.

The halide solid electrolyte may be a material represented by the following Formula (A3).

$$Li_{3-3\delta}Y_{1+\delta}Cl_6 \quad (A3)$$

In Formula (A3), $0<\delta\le 0.15$ is satisfied.

The halide solid electrolyte may be a material represented by the following Formula (A4).

$$Li_{3-3\delta}Y_{1+\delta}Br_6 \quad (A4)$$

In Formula (A4), $0<\delta\le 0.25$ is satisfied.

The halide solid electrolyte may be a material represented by the following Formula (A5).

$$Li_{3-3\delta+a}Y_{1+\delta-a}Me_aCl_{6-x-y}Br_xI_y \quad (A5)$$

In Formula (A5), Me includes at least one selected from the group consisting of Mg, Ca, Sr, Ba, and Zn. Me may be at least one selected from the group consisting of Mg, Ca, Sr, Ba, and Zn.

In Formula (A5), $-1<\delta<2$, $0<a<3$, $0<(3-3\delta+a)$, $0<(1+\delta-a)$, $0\le x\le 6$, $0\le y\le 6$, and $(x+y)\le 6$ are satisfied.

The halide solid electrolyte may be a material represented by the following Formula (A6).

$$Li_{3-3\delta}Y_{1+\delta-a}Me_aCl_{6-x-y}Br_xI_y \quad (A6)$$

In Formula (A6), Me includes at least one selected from the group consisting of Al, Sc, Ga, and Bi. Me may be at least one selected from the group consisting of Al, Sc, Ga, and Bi.

In Formula (A6), $-1<\delta<1$, $0<a<2$, $0<(1+\delta-a)$, $0\le x\le 6$, $0\le y\le 6$, and $(x+y)\le 6$ are satisfied.

The halide solid electrolyte may be a material represented by the following Formula (A7).

$$Li_{3-3\delta-a}Y_{1+\delta-a}Me_aCl_{6-x-y}Br_xI_y \quad (A7)$$

In Formula (A7), Me includes at least one selected from the group consisting of Zr, Hf, and Ti. Me may be at least one selected from the group consisting of Zr, Hf, and Ti.

In Formula (A7), $-1<\delta<1$, $0<a<1.5$, $0<(3-3\delta-a)$, $0<(1+\delta-a)$, $0\le x\le 6$, $0\le y\le 6$, and $(x+y)\le 6$ are satisfied.

The halide solid electrolyte may be a material represented by the following Formula (A8).

$$Li_{3-3\delta-2a}Y_{1+\delta-a}Me_aCl_{6-x-y}Br_xI_y \quad (A8)$$

In Formula (A8), Me includes at least one selected from the group consisting of Ta and Nb. Me may be at least one selected from the group consisting of Ta and Nb.

In Formula (A8), $-1<\delta<1$, $0<a<1.2$, $0<(3-3\delta 2a)$, $0<(1+\delta-a)$, $0\le x\le 6$, $0\le y\le 6$, and $(x+y)\le 6$ are satisfied.

More specifically, $Li_3YX_6$, $Li_2MgX_4$, $Li_2FeX_4$, $Li(Al,Ga,In)X_4$, or $Li_3(Al,Ga,In)X_6$, for example, can be used as the halide solid electrolyte. Here, X is at least one selected from the group consisting of F, Cl, Br, and I.

As used herein, the notation "(A,B,C)" in a chemical formula means "at least one selected from the group consisting of A, B, and C". For example, "(Al,Ga,In)" is synonymous with "at least one selected from the group consisting of Al, Ga, and In". The same holds true for other elements.

The halide solid electrolyte may be free of sulfur. This can avoid the generation of hydrogen sulfide gas, thus making it possible to realize a battery with enhanced safety.

There is no particular limitation on the shape of the solid electrolyte 100. The shape of the solid electrolyte 100 may be, for example, acicular, spherical, or spheroidal. For example, the solid electrolyte 100 may have a particulate shape.

For example, when the solid electrolyte 100 has a particulate (e.g., spherical) shape, the solid electrolyte 100 may have a median diameter of less than or equal to 100 μm. When the median diameter of the solid electrolyte 100 is less than or equal to 100 μm, the cathode active material 110 and the solid electrolyte 100 can form a good dispersion state in the cathode 1000. This improves the charge and discharge characteristics of the battery.

The median diameter of the solid electrolyte 100 may be less than or equal to 10 μm. Such a feature enables the cathode active material 110 and the solid electrolyte 100 to form a good dispersion state in the cathode 1000.

The median diameter of the solid electrolyte 100 may be smaller than the median diameter of the cathode active material 110. Such a feature enables the cathode active material 110 and the solid electrolyte 100 to form a better dispersion state in the cathode 1000.

There is no particular limitation on the shape of the cathode active material 110. The shape of the cathode active material 110 may be, for example, acicular, spherical, or spheroidal. For example, the cathode active material 110 may have a particulate shape.

The median diameter of the cathode active material 110 may be greater than or equal to 0.1 μm and less than or equal to 100 μm. When the median diameter of the cathode active material 110 is greater than or equal to 0.1 μm, the cathode active material 110 and the solid electrolyte 100 can form a good dispersion state in the cathode 1000. This improves the charge and discharge characteristics of the battery. When the median diameter of the cathode active material 110 is less than or equal to 100 μm, a sufficient rate of lithium diffusion in the cathode active material 110 is ensured. The battery can therefore operate at a high-power output.

The median diameter of the cathode active material 110 may be larger than the median diameter of the solid electrolyte 100. This enables the cathode active material 110 and the solid electrolyte 100 to form a good dispersion state.

As used herein, median diameter refers to a particle size (d50) at 50% cumulative volume in a volume-based particle size distribution. The volume-based particle size distribution can be measured, for example, with a laser diffraction measurement device or an image analysis device.

In the cathode 1000, the solid electrolyte 100 and the cathode active material 110 may be in contact with each other.

The cathode 1000 may include particles of a plurality of solid electrolytes 100 and particles of a plurality of cathode active materials 110.

In the cathode 1000, the content of the solid electrolyte 100 and the content of the cathode active material 110 may be the same or different.

The cathode 1000 may include a plurality of conductive materials 140.

The cathode 1000 may include a plurality of carbon blacks 150.

Method for Manufacturing Cathode

Figure 2:
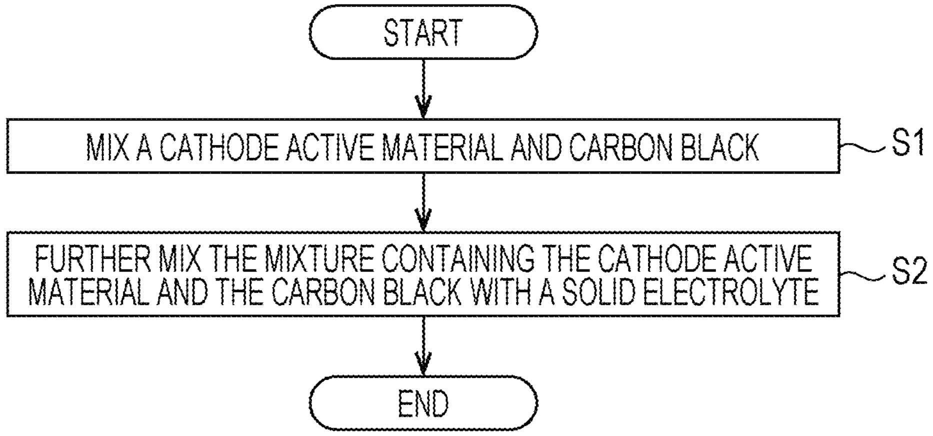
FIG. 2 is a flow chart illustrating a method for manufacturing the cathode according to Embodiment 1.

A method for manufacturing the cathode 1000 will now be described with reference to FIG. 2. FIG. 2 is a flow chart illustrating a method for manufacturing the cathode 1000. The cathode 1000 can be manufactured by the steps illustrated in the flow chart.

First, the cathode active material 110 and the carbon black 150 are mixed (step S1). The cathode active material 110 and the carbon black 150 satisfy the limitations on the parameters of Equation (1). Step S1 may be performed, for example, by preparing a solvent and the carbon black 150, mixing the solvent and the carbon black 150, and then adding the cathode active material 110 to the mixture and mixing the resulting mixture. Next, the resulting mixture containing the cathode active material 110 and the carbon black 150 is further mixed with the solid electrolyte 100 (step S2) to obtain a cathode material slurry containing a mixture of the cathode active material 110, the solid electrolyte 100 and the carbon black 150. The slurry is applied onto a current collector, followed by drying to obtain a cathode 1000.

In this embodiment, the cathode active material 110, the solid electrolyte 100 and the carbon black 150 are not mixed at a time; instead, the cathode active material 110 and the carbon black 150 are first mixed, and the resulting mixture is then mixed with the solid electrolyte 100. Such a method can preferentially dispose the carbon black 150 on the surface of the cathode active material 110. Therefore, the carbon black 150 is likely to concentrate on the surface of the cathode active material 110. This makes it possible to provide a cathode 1000 in which the cathode active material 110 has an increased effective reaction area, thus providing a battery having a reduced resistance.

Even when the cathode active material 110 and the carbon black 150 satisfy the limitations on the parameters of Equation (1), the cathode 1000 of the present disclosure cannot be obtained if the cathode active material 110, the solid electrolyte 100 and the carbon black 150 are mixed simultaneously.

There is no particular limitation on a method for mixing the cathode active material 110 and the carbon black 150. There is no particular limitation on a method for further mixing the mixture containing the cathode active material 110 and the carbon black 150 with the solid electrolyte 100. For example, the cathode active material 110 and the carbon black 150 may be mixed using a machine such as a homogenizer. Similarly, the mixture containing the cathode active material 110 and the carbon black 150 may be further mixed with the solid electrolyte 100 using a machine such as a homogenizer. The use of a homogenizer can achieve uniform mixing. The mixing ratio between the cathode active material 110 and the solid electrolyte 100 is not particularly limited.

Variation 1

Figure 3:
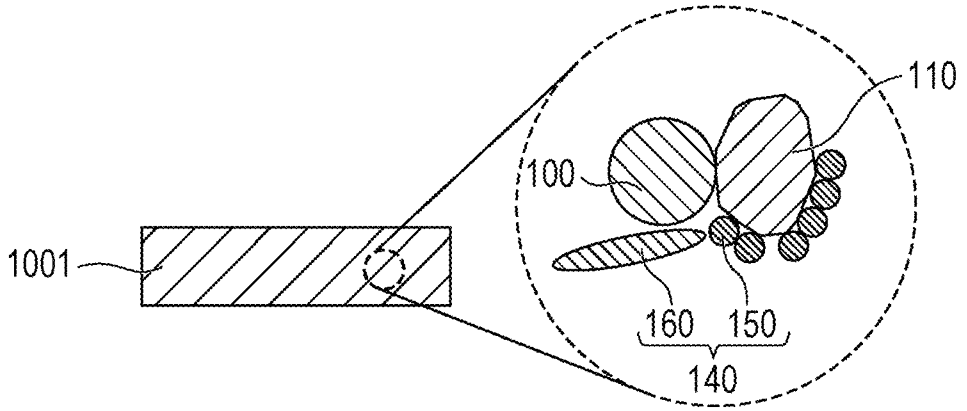
FIG. 3 is a cross-sectional diagram showing a schematic construction of a cathode according to Variation 1.

FIG. 3 is a cross-sectional diagram showing a schematic construction of a cathode 1001 according to Variation 1. In the cathode 1001, the conductive material 140 further comprises a fibrous carbon material 160. Thus, in Variation 1, the conductive material 140 comprises the carbon black 150 and the fibrous carbon material 160. The conductive material 140 may thus further comprise the fibrous carbon material 160. Such a feature can further increase the electron conductivity of the cathode 1001.

Examples of the fibrous carbon material 160 include vapor-grown carbon fibers, carbon nanotubes, and carbon nanofibers. The fibrous carbon material 160 may comprise either one, or two or more of these materials. The fibrous carbon material 160 may be composed of one of these materials, or composed of two or more of these materials.

The cathode 1001 of Variation 1 may include a plurality of fibrous carbon materials 160.

Method for Manufacturing Cathode

Figure 4:
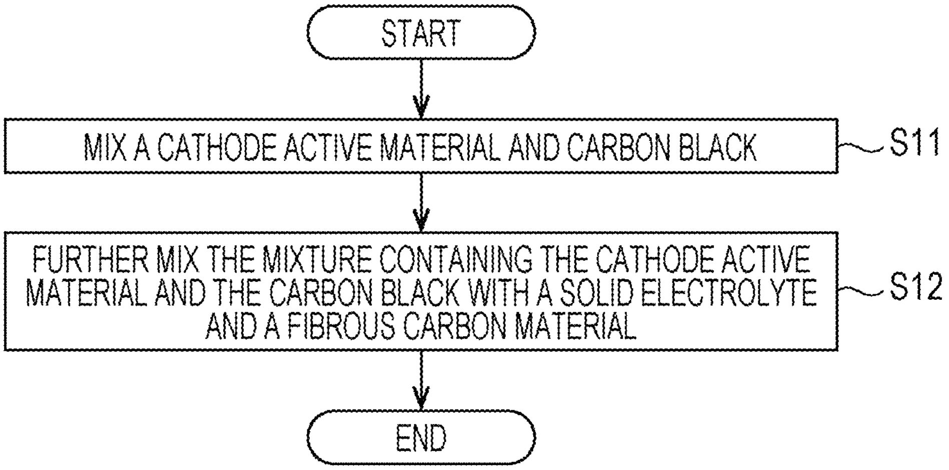
FIG. 4 is a flow chart illustrating a method for manufacturing the cathode according to Variation 1.

A method for manufacturing the cathode 1001 will now be described with reference to FIG. 4. FIG. 4 is a flow chart illustrating a method for manufacturing the cathode 1001. The cathode 1001 can be manufactured by the steps illustrated in the flow chart.

First, the cathode active material 110 and the carbon black 150 are mixed (step S11). Step S11 is the same step as step S1 of FIG. 2. Next, the resulting mixture containing the cathode active material 110 and the carbon black 150 is further mixed with the solid electrolyte 100 and the fibrous carbon material 160 (step S12) to obtain a cathode material slurry containing a mixture of the cathode active material 110, the solid electrolyte 100, the carbon black 150 and the fibrous carbon material 160. The slurry is applied onto a current collector, followed by drying to obtain a cathode 1001.

Variation 2

Figure 5:
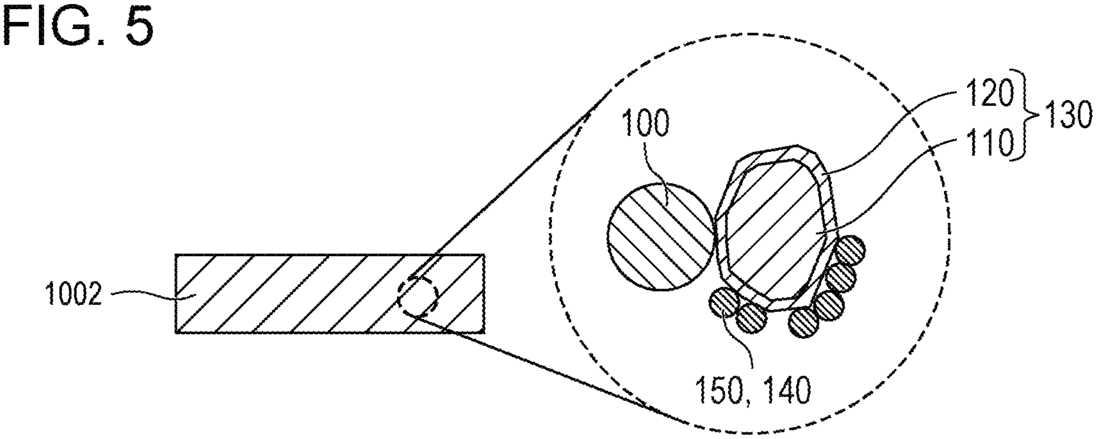
FIG. 5 is a cross-sectional diagram showing a schematic construction of a cathode according to Variation 2.

FIG. 5 is a cross-sectional diagram showing a schematic construction of a cathode 1002 according to Variation 2. The cathode 1002 further includes a coating layer 120 which covers at least part of the surface of the cathode active material 110. The cathode active material 110, at least part of whose surface is covered with the coating layer 120, is herein referred to as a "coated cathode active material 130". The cathode 1002 may thus further include the coating layer 120 which covers at least part of the surface of the cathode active material 110. Such a feature can further reduce the resistance of the battery.

The coating layer 120 is in direct contact with the cathode active material 110.

The material constituting the coating layer 120 will hereinafter be referred to as the "coating material". The coated cathode active material 130 of Embodiment 2 comprises the cathode active material 110 and the coating material. The coating material, which is present on at least part of the surface of the cathode active material 110, constitutes the coating layer 120.

The coating layer 120 may uniformly cover the cathode active material 110. Such a feature allows close contact between the cathode active material 110 and the coating layer 120, and can therefore further reduce the resistance of the battery.

The coating layer 120 may cover only a portion of the surface of the cathode active material 110. Cathode active material 110 particles are in direct contact with each other via portions not covered with the coating layer 120. This increases the electron conductivity between the cathode active material 110 particles, enabling the battery to operate at a high-power output.

The coating of the cathode active material 110 with the coating layer 120 prevents the formation of an oxide film due to oxidative decomposition of another solid electrolyte during charging of the battery, resulting in an increase in the charge and discharge efficiency of the battery. The solid electrolyte 100 is an example of the other solid electrolyte.

The coating material may comprise Li and at least one selected from the group consisting of O, F, and Cl.

The coating material may comprise at least one selected from the group consisting of lithium niobate, lithium phosphate, lithium titanate, lithium tungstate, lithium fluorozirconate, lithium fluoroaluminate, lithium fluorotitanate, and lithium fluoromagnesate.

The coating material may be lithium niobate ($LiNbO_3$).

Method for Manufacturing Cathode

The cathode 1002 can be manufactured by replacing the cathode active material 110 with the coated cathode active material 130 in the cathode 1000 manufacturing method illustrate in FIG. 2. The cathode active material 110 of the coated cathode active material 130, and the carbon black 150 satisfy the limitations on the parameters of Equation (1).

The coated cathode active material 130 can be produced, for example, by the following method. First, the coating layer 120 is formed on the surfaces of particles of the cathode active material 110. There is no particular limitation on a method for forming the coating layer 120. A liquid-phase coating method or a gas-phase coating method may be used for the formation of the coating layer 120.

In the liquid-phase coating method, for example, a precursor solution of an ion conductive material is applied to the surface of the cathode active material 110. When a coating layer 120 comprising $LiNbO_3$ is formed, the precursor solution may be a mixed solution (sol solution) of a solvent, a lithium alkoxide and a niobium alkoxide. The lithium alkoxides is, for example, lithium ethoxide. The niobium alkoxides is, for example, niobium ethoxide. The solvent is, for example, an alcohol such as ethanol. The amounts of the lithium alkoxide and the niobium alkoxide are adjusted according to the intended composition of the coating layer 120. Water may be added to the precursor solution as necessary. The precursor solution may be acidic or alkaline.

There is no particular limitation on a method for applying the precursor solution to the surface of the cathode active material 110. For example, the precursor solution can be applied to the surface of the cathode active material 110 using a tumbling fluidized bed granulating-coating machine. The tumbling fluidized bed granulating-coating machine can apply the precursor solution to the surface of the cathode active material 110 by spraying the precursor solution onto the cathode active material 110 while tumbling and fluidizing the cathode active material 110. A precursor coating is thud formed on the surface of the cathode active material 110. Thereafter, the cathode active material 110 covered with the precursor coating is heat-treated. The heat treatment promotes gelation of the precursor coating to form the coating layer 120. The coated cathode active material 130 is thus obtained. At that point, the coating layer 120 covers approximately the entire surface of the cathode active material 110. The thickness of the coating layer 120 is generally uniform.

Examples of the gas-phase coating method include pulsed laser deposition (PLD), vacuum deposition, sputtering, thermal chemical vapor deposition (CVD), and plasma chemical vapor deposition. In the PLD method, for example, an ion conductive material as a target is irradiated by high-energy pulsed laser light (e.g., KrF excimer laser light, wavelength: 248 nm), and the sublimated ion conductive material is deposited on the surface of the cathode active material 110. When the coating layer 120 of $LiNbO_3$ is formed, high-density sintered $LiNbO_3$ is used as a target.

Variation 3

Figure 6:
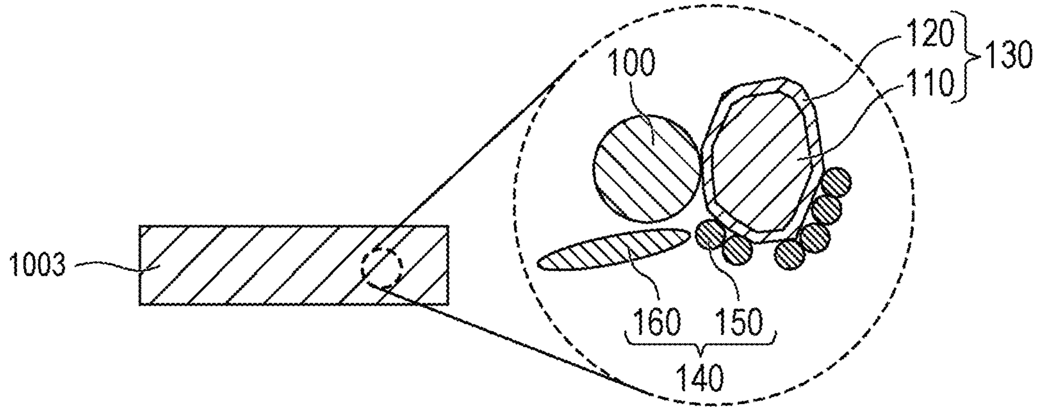
FIG. 6 is a cross-sectional diagram showing a schematic construction of a cathode according to Variation 3.

FIG. 6 is a cross-sectional diagram showing a schematic construction of a cathode 1003 according to Variation 3. The cathode 1003 has the same construction as the cathode 1001 according to Variation 1 except that it further includes the coating layer 120 which covers at least part of the surface of the cathode active material 110. Further, the cathode 1003 has the same construction as the cathode 1002 according to Variation 2 except that the conductive material 140 further comprises the fibrous carbon material 160. Thus, the cathode 1003 may further include the coating layer 120 which covers at least part of the surface of the cathode active material 110, and the conductive material 140 may further include the fibrous carbon material 160. Such a feature can further increase the electron conductivity of the cathode 1003.

The cathode 1003 of Variation 3 may include a plurality of fibrous carbon materials 160.

Method for Manufacturing Cathode

The cathode 1003 can be manufactured by replacing the cathode active material 110 with the coated cathode active material 130 in the cathode 1001 manufacturing method illustrate in FIG. 4. The cathode active material 110 of the coated cathode active material 130, and the carbon black 150 satisfy the limitations on the parameters of Equation (1). The coated cathode active material 130 can be manufactured by the method described above with reference to Variation 2.

Embodiment 2

Embodiment 2 will now be described. A description that duplicates a description given above with reference to Embodiment 1 may sometimes be omitted.

Figure 7:
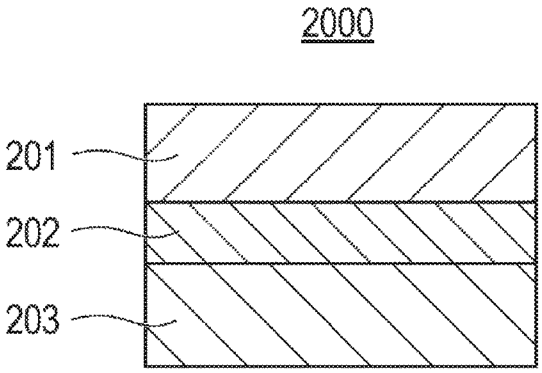
FIG. 7 is a cross-sectional diagram showing a schematic construction of a battery according to Embodiment 2.

FIG. 7 is a cross-sectional diagram showing a schematic construction of a battery 2000 according to Embodiment 2.

The battery 2000 of Embodiment 2 includes a cathode 201, an electrolyte layer 202, and an anode 203. The cathode 201 is one of the cathodes of Embodiment 1 and Variations 1 to 3. The electrolyte layer 202 is disposed between the cathode 201 and the anode 203.

Such a construction increases the effective reaction area of the cathode active material 110 in the cathode 201. This enables a reduction in the resistance of the battery 2000.

When the cathode 201 is the cathode 1000 or the cathode 1001 of Embodiment 1, in the volume ratio "v1:(100−v1)" between the cathode active material 110 and the solid electrolyte 100 in the cathode 201, $30 \leq v1 \leq 95$ may be satisfied. Here, v1 represents the volume ratio of the cathode active material 110 when the total volume of the cathode active material 110 and the solid electrolyte 100, contained in the cathode 201, is assumed to be 100. When $30 \leq v1$ is satisfied, a sufficient energy density of the battery 2000 can be secured. When $v1 \leq 95$ is satisfied, the battery 2000 can operate at a high-power output.

When the cathode 201 is the cathode 1002 or the cathode 1003 of Embodiment 1, in the volume ratio "v11:(100−v11)" between the coated cathode active material 130 and the solid electrolyte 100 in the cathode 201, $30 \leq v11 \leq 95$ may be satisfied. Here, v11 represents the volume ratio of the coated cathode active material 130 when the total volume of the coated cathode active material 130 and the solid electrolyte 100, contained in the cathode 201, is assumed to be 100. When $30 \leq v11$ is satisfied, a sufficient energy density of the battery 2000 can be secured. When $v11 \leq 95$ is satisfied, the battery 2000 can operate at a high-power output.

The thickness of the cathode 201 may be greater than or equal to 10 μm and less than or equal to 500 μm. When the thickness of the cathode 201 is greater than or equal to 10 μm, a sufficient energy density of the battery 2000 can be secured. When the thickness of the cathode 201 is less than or equal to 500 μm, the battery 2000 can operate at a high-power output.

The electrolyte layer 202 is a layer comprising an electrolyte. The electrolyte is, for example, a solid electrolyte. Thus, the electrolyte layer 202 may be a solid electrolyte layer. The exemplary materials described above as the solid electrolyte 100 with reference to Embodiment 1 may be used as the solid electrolyte constituting the electrolyte layer 202. Thus, the electrolyte layer 202 may comprise a solid electrolyte having the same composition as that of the solid electrolyte 100. Such a feature can further increase the charge and discharge efficiency of the battery 2000.

The electrolyte layer 202 may comprise a halide solid electrolyte having a composition different from that of the solid electrolyte 100.

The electrolyte layer 202 may comprise a sulfide solid electrolyte.

The electrolyte layer 202 may solely comprise a single solid electrolyte selected from the solid electrolyte materials listed above.

The electrolyte layer 202 may comprise two or more solid electrolytes selected from the solid electrolyte materials listed above. In that case, the solid electrolytes have different compositions. For example, the electrolyte layer 202 may comprise a halide solid electrolyte and a sulfide solid electrolyte.

The thickness of the electrolyte layer 202 may be greater than or equal to 1 μm and less than or equal to 300 μm. When the thickness of the electrolyte layer 202 is greater than or equal to 1 μm, a short-circuit between the cathode 201 and the anode 203 is unlikely to occur. When the thickness of the electrolyte layer 202 is less than or equal to 300 μm, the battery 2000 can operate at a high-power output.

The anode 203 includes a material having the property of occluding and releasing metal ions (e.g., lithium ions). The anode 203 comprises, for example, an anode active material.

A metal material, a carbon material, an oxide, a nitride, a tin compound, a silicon compound, or the like can be used as the anode active material. The metal material may be a single-component metal. The metal material may be an alloy. The metal material is, for example, lithium metal or a lithium alloy. Examples of the carbon material include natural graphite, coke, ungraphitized carbon, carbon fibers, spherical carbon, artificial graphite, and amorphous carbon. The use of silicon (Si), tin (Sn), a silicon compound, a tin compound, or the like can increase the volume density.

The anode 203 may include a solid electrolyte. Such a feature increases the lithium ion conductivity within the anode 203, whereby the battery 2000 can operate at a high-power output. The exemplary materials described above as the solid electrolyte 100 with reference to Embodiment 1 may be used as the solid electrolyte contained in the anode 203. Thus, the anode 203 may include a solid electrolyte having the same composition as that of the solid electrolyte 100.

There is no particular limitation on the shape of the solid electrolyte contained in the anode 203 of Embodiment 2. The shape of the solid electrolyte contained in the anode 203 may be, for example, acicular, spherical, or spheroidal. For example, the solid electrolyte contained in the anode 203 may have a particulate shape.

When the solid electrolyte contained in the anode 203 has a particulate (e.g., spherical) shape, the solid electrolyte may have a median diameter of less than or equal to 100 μm. When the median diameter of the solid electrolyte is less than or equal to 100 μm, the anode active material and the solid electrolyte can form a good dispersion state in the anode 203. This improves the charge and discharge characteristics of the battery 2000.

The median diameter of the solid electrolyte contained in the anode 203 may be less than or equal to 10 μm, and may even be less than or equal to 1 μm. Such a feature enables the anode active material and the solid electrolyte to form a good dispersion state in the anode 203.

The median diameter of the solid electrolyte contained in the anode 203 may be smaller than the median diameter of the anode active material. Such a feature enables the anode active material and the solid electrolyte to form a better dispersion state in the anode 203.

There is no particular limitation on the shape of the anode active material of Embodiment 2. The shape of the anode active material may be, for example, acicular, spherical, or spheroidal. For example, the anode active material may have a particulate shape.

The median diameter of the anode active material may be greater than or equal to 0.1 μm and less than or equal to 100 μm. When the median diameter of the anode active material is greater than or equal to 0.1 μm, the anode active material and the solid electrolyte can form a good dispersion state in the anode 203. This improves the charge and discharge characteristics of the battery 2000. When the median diameter of the anode active material is less than or equal to 100 μm, a sufficient rate of lithium diffusion in the anode active material is ensured. The battery 2000 can therefore operate at a high-power output.

The median diameter of the anode active material may be larger than the median diameter of the solid electrolyte contained in the anode 203. This enables the anode active material and the solid electrolyte to form a good dispersion state.

In the volume ratio "v2:(100−v2)" between the anode active material and the solid electrolyte in the anode 203, $30 \leq v2 \leq 95$ may be satisfied. Here, v2 represents the volume ratio of the anode active material when the total volume of the anode active material and the solid electrolyte, contained in the anode 203, is assumed to be 100. When $30 \leq v2$ is satisfied, a sufficient energy density of the battery 2000 can be secured. When $v2 \leq 95$ is satisfied, the battery 2000 can operate at a high-power output.

The thickness of the anode 203 may be greater than or equal to 10 μm and less than or equal to 500 μm. When the thickness of the anode 203 is greater than or equal to 10 μm, a sufficient energy density of the battery 2000 can be secured. When the thickness of the anode 203 is less than or equal to 500 μm, the battery 2000 can operate at a high-power output.

At least one selected from the group consisting of the cathode 201, the electrolyte layer 202, and the anode 203 may contain a binder for increasing adhesion between particles. The binder is used to improve the binding properties of a material(s) constituting the electrode(s). Examples of the binder include polyvinylidene fluoride, polytetrafluoroethylene, polyethylene, polypropylene, an aramid resin, polyamide, polyimide, polyamideimide, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyether, polyethersulfone, hexafluoropolypropylene, a styrene-butadiene rubber, and carboxymethylcellulose. It is also possible to use as the binder a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more selected from the above-described materials may also be used as the binder.

The anode 203 may contain a conductive additive for increasing the electron conductivity. Examples of usable conductive additives include natural or artificial graphite; carbon black such as acetylene black, furnace black, or Ketjen black; conductive fibers such as carbon fibers or metal fibers; a fluorocarbon; a metal powder such as aluminum powder; conductive whiskers such as zinc oxide or potassium titanate whiskers; a conductive metal oxide such as titanium oxide; and a conductive polymer compound such as polyaniline, polypyrrole, or polythiophene. The use of a carbon conductive additive can achieve a cost reduction.

The shape of the battery 2000 of Embodiment 2 includes, for example, a coin shape, a cylindrical shape, a rectangular shape, a sheet-like shape, a button shape, a flat shape, and a laminate shape.

EXAMPLES

The following examples and comparative examples illustrate the present disclosure in greater detail.

First, details of the present disclosure will be described with reference to Examples 1 to 7 and Comparative Examples 1 and 2. In Examples 1 to 7 and Comparative Examples 1 and 2, $LiNi_{0.8}(Co,Mn)_{0.2}O_2$ (hereinafter referred to as NCM) was used as a cathode active material.

Example 1

Production of Sulfide Solid Electrolyte

In an argon glove box with a dew point of less than or equal to −60° C., raw material powders $Li_2S$ and $P_2S_5$ were weighed at a molar ratio $Li_2S$:$P_2S_5$ of 75:25. The raw material powders were pulverized and mixed in a mortar to obtain a mixture. Thereafter, the mixture was milled using a planetary ball mill (P-7, manufactured by Fritsch) under the conditions of 10 hours and 510 rpm to obtain a glassy solid electrolyte. The solid electrolyte was heat-treated under the conditions of an inert atmosphere, 270° C., and 2 hours to produce a glass ceramic-like $Li_2S$—$P_2S_5$ (hereinafter referred to as LPS), which is a sulfide solid electrolyte.

Production of Coated Cathode Active Material

NCM was used as a cathode active material. $LiNbO_3$ was used as a coating material. A coating layer comprising $LiNbO_3$ was formed by a liquid-phase coating method. In particular, a precursor solution of an ion conductive material was first applied to the surface of the NCM to form a precursor coating on the surface of the NCM. The NCM covered with the precursor coating was then heat-treated. Gelation of the precursor coating progressed through the heat treatment to form a coating layer of $LiNbO_3$. A coated cathode active material (hereinafter referred to as Nb-NCM) was thus obtained. The BET specific surface area a of the Nb-NCM produced was 0.36 $m^2/g$.

Production of Cathode

Acetylene black having an average particle size of 23 nm was used as a conductive material. A binder, a solvent, and the acetylene black were mixed in an argon glove box with a dew point of less than or equal to −60° C., and dispersed using a homogenizer to obtain a mixture of the binder, the solvent, and the acetylene black. Nb-NCM as a coated cathode active material was added to and mixed with the mixture, and the components were dispersed by a homogenizer. Thereafter, LPS as a solid electrolyte was added to and mixed with the mixture, and the components were dispersed by a homogenizer to prepare a cathode material slurry. The mixing ratio between Nb-NCM and LPS was 70:30 in volume ratio. The ratio c of the mass of acetylene black to the mass of Nb-NCM was 0.0030. The ratio of the total mass of conductive material to the mass of Nb-NCM was 0.0030. The slurry was applied onto a current collector, followed by drying on a hot plate to produce a cathode.

Production of Battery

Lithium titanate (hereinafter referred to as LTO) was used as an anode active material. A binder, a solvent, LPS, and carbon fibers (VGCF-H, manufactured by Showa Denko) were mixed in an argon glove box with a dew point of less than or equal to −60° C., and dispersed using a homogenizer to obtain a mixture of the binder, the solvent, LPS, and VGCF-H. LTO as a solid electrolyte was added to and mixed with the mixture, and the components were dispersed by a homogenizer to prepare an anode material slurry. The slurry was applied onto a current collector, followed by drying on a hot plate to produce an anode. The mixing ratio between LTO and LPS was 65:35 in volume ratio. The ratio of the mass of VGCF-H to the mass of LTO was 0.024. "VGCF" is a registered trademark of Showa Denko K.K.

LPS, a binder and a solvent were mixed, and dispersed using a homogenizer to prepare a slurry containing LPS. The slurry was applied onto a substrate, followed by drying on a hot plate to produce an electrolyte layer.

The anode and the electrolyte layer were superimposed on each other, and the laminate was subjected to pressure forming while heating the laminate. Thereafter, the substrate was removed from the electrolyte layer. Subsequently, the cathode was superimposed on the opposite side of the pressure-formed product from the anode so that the electrolyte layer contacts the cathode. The laminate was then subjected to pressure forming while heating the laminate. Current collector leads were attached to the pressure-formed product, and the product was placed in a laminate packaging material and the packaging material was sealed. In this manner, the battery of Example 1 was produced.

Example 2

The battery of Example 2 was produced in the same manner as in Example 1 except that in the cathode production process, the ratio c of the mass of acetylene black to the mass of Nb-NCM was changed to 0.0048.

Example 3

The battery of Example 3 was produced in the same manner as in Example 1 except that in the cathode production process, the ratio c of the mass of acetylene black to the mass of Nb-NCM was changed to 0.0065.

Example 4

In the cathode production process, the ratio c of the mass of acetylene black to the mass of Nb-NCM was 0.0048. Further, in the cathode production process, upon the addition and mixing of the LPS as a solid electrolyte, carbon fibers (VGCF-H) as a conductive material were also added to and mixed with the mixture, and the components were dispersed by a homogenizer to prepare a cathode material slurry. The ratio of the mass of VGCF-H to the mass of Nb-NCM was 0.016. The ratio c of the mass of acetylene black to the mass of Nb-NCM was 0.0048. The ratio of the total mass of conductive material to the mass of Nb-NCM was 0.0208. The battery of Example 4 was produced in the same manner as in Example 1 except for these differences.

Example 5

In the cathode production process, the ratio of the mass of VGCF-H to the mass of Nb-NCM was 0.020. The ratio c of the mass of acetylene black to the mass of Nb-NCM was 0.0013. The ratio of the total mass of conductive material to the mass of Nb-NCM was 0.0213. The battery of Example 5 was produced in the same manner as in Example 4 except for these differences.

Example 6

In the cathode production process, the ratio of the mass of VGCF-H to the mass of Nb-NCM was 0.020. The ratio c of the mass of acetylene black to the mass of Nb-NCM was 0.0030. The ratio of the total mass of conductive material to the mass of Nb-NCM was 0.0230. The battery of Example 6 was produced in the same manner as in Example 4 except for these differences.

Example 7

In the cathode production process, the ratio of the mass of VGCF-H to the mass of Nb-NCM was 0.020. The ratio c of the mass of acetylene black to the mass of Nb-NCM was 0.0048. The ratio of the total mass of conductive material to the mass of Nb-NCM was 0.0248. The battery of Example 7 was produced in the same manner as in Example 4 except for these differences.

Comparative Example 1

In the cathode production process, only carbon fibers (VGCF-H) were used as a conductive material. A binder, a solvent, and VGCF-H were mixed in an argon glove box with a dew point of less than or equal to −60° C., and dispersed using a homogenizer. Nb-NCM as a coated cathode active material and LPS as a solid electrolyte were added to and mixed with the mixture at a time, and the components were dispersed by a homogenizer to prepare a cathode material slurry. The ratio of the mass of VGCF-H to the mass of Nb-NCM was 0.008. The ratio of the total mass of conductive material to the mass of Nb-NCM was 0.0080. The battery of Comparative Example 1 was produced in the same manner as in Example 1 except for these differences.

Comparative Example 2

In the cathode production process, the ratio of the mass of VGCF-H to the mass of Nb-NCM was 0.024. The ratio of the total mass of conductive material to the mass of Nb-NCM was 0.0240. The battery of Comparative Example 2 was produced in the same manner as in Comparative Example 1 except for these differences.

Charge/Discharge Test

A charge/discharge test was conducted under the following conditions using the batteries of Examples 1 to 7 and Comparative Examples 1 and 2.

Each battery was set in a constant temperature bath at 25° C. and connected to a charging/discharging device.

Constant-current charging was performed at a current value of 2 mA, which corresponds to a rate of 0.1 C (10-hour rate) with respect to the theoretical capacity of the battery, to a voltage of 2.7V, and then constant-voltage charging was performed at a voltage of 2.7V, and charging was terminated at a current value of 0.2 mA corresponding to a rate of 0.01 C. Thereafter, constant-current discharging was performed at a rate of 0.1 C (10-hour rate) to a voltage of 1.5V, and then constant-voltage discharging was performed at a voltage of 1.5V to a rate of 0.01 C.

Thereafter, charging was performed again under the same conditions, and constant-current discharging was performed at a rate of 0.1 C to a voltage of 2.2V, and then constant-voltage discharging was performed at a voltage of 2.2V to a rate of 0.01 C. Further, after a rest, constant-current discharging was performed for 10 seconds at a current value of 24 mA. The direct current resistance of a battery, calculated by the following Equation (4), is herein referred to as DCR (Direct Current Resistance).

$$DCR=(Vo-V)\times S/I \quad (4)$$

Here, Vo is a voltage before the 10-second discharging. V is a voltage after the 10-second discharging. S is the area of contact between the cathode and the electrolyte layer. I is a current value, which is 24 mA.

For the batteries of Examples 1 to 7 and Comparative Examples 1 to 2, DCR ratios, which are based on DCR values calculated by Equation (4), are shown in Table 1 along with x values determined by Equation (1). The DCR ratios are values normalized by setting the DCR value of the battery of Comparative Example 2 to 100.

Example 9

In the cathode production process, the ratio c of the mass of acetylene black to the mass of Nb-NCA was 0.0013. Further, in the cathode production process, upon the addition and mixing of the LPS as a solid electrolyte, carbon fibers (VGCF-H) as a conductive material were also added to and mixed with the mixture, and the components were dispersed by a homogenizer to prepare a cathode material slurry. The ratio of the mass of VGCF-H to the mass of Nb-NCA was 0.020. The ratio of the total mass of conductive material to the mass of Nb-NCA was 0.0213. The battery of Example 9 was produced in the same manner as in Example 8 except for these differences.

Example 10

In the cathode production process, the ratio c of the mass of acetylene black to the mass of Nb-NCA was 0.0030. The ratio of the total mass of conductive material to the mass of Nb-NCA was 0.0230. The battery of Example 10 was produced in the same manner as in Example 9 except for these differences.

TABLE 1

| | Coated cathode active material | BET specific surface area a [$m^2/g$] of coated cathode active material | VGCF-H/coated cathode active material (mass ratio) | Acetylene black/coated cathode active material (mass ratio c) | Total amount of conductive material/coated cathode active material (mass ratio) | x [%] | DCR ratio |
|---|---|---|---|---|---|---|---|
| Example 1 | Nb-NCM | 0.36 | 0 | 0.0030 | 0.0030 | 27.2 | 84 |
| Example 2 | Nb-NCM | 0.36 | 0 | 0.0048 | 0.0048 | 43.5 | 77 |
| Example 3 | Nb-NCM | 0.36 | 0 | 0.0065 | 0.0065 | 58.9 | 83 |
| Example 4 | Nb-NCM | 0.36 | 0.016 | 0.0048 | 0.0208 | 43.5 | 81 |
| Example 5 | Nb-NCM | 0.36 | 0.020 | 0.0013 | 0.0213 | 11.8 | 77 |
| Example 6 | Nb-NCM | 0.36 | 0.020 | 0.0030 | 0.0230 | 27.2 | 82 |
| Example 7 | Nb-NCM | 0.36 | 0.020 | 0.0048 | 0.0248 | 43.5 | 82 |
| Comp. Example 1 | Nb-NCM | 0.36 | 0.008 | 0 | 0.0080 | 0.0 | 111 |
| Comp. Example 2 | Nb-NCM | 0.36 | 0.024 | 0 | 0.0240 | 0.0 | 100 |

Details of the present disclosure will now be described with reference to Examples 8 to 10 and Comparative Example 3. In Examples 8 to 10 and Comparative Example 3, $LiNi_{0.8}(Co,Al)_{0.2}O_2$ (hereinafter referred to as NCA) was used as a cathode active material.

Example 8

A coated cathode active material (hereinafter referred to as Nb-NCA) was produced in the same manner as in Example 1 except for using NCA as a cathode active material in the coated cathode active material production process. The BET specific surface area a of the Nb-NCA produced was 0.75 $m^2/g$.

In the cathode production process, the ratio c of the mass of acetylene black to the mass of Nb-NCA was 0.0048. The ratio of the total mass of conductive material to the mass of Nb-NCA was 0.0048. The battery of Example 8 was produced in the same manner as in Example 1 except for these differences.

Comparative Example 3

In the cathode production process, only carbon fibers (VGCF-H) were used as a conductive material. A binder, a solvent, and VGCF-H were mixed in an argon glove box with a dew point of less than or equal to −60° C., and dispersed using a homogenizer. Nb-NCA as a coated cathode active material and LPS as a solid electrolyte were added to and mixed with the mixture at a time, and the components were dispersed by a homogenizer to prepare a cathode material slurry. The ratio of the mass of VGCF-H to the mass of Nb-NCA was 0.024. The ratio of the total mass of conductive material to the mass of Nb-NCA was 0.0240. The battery of Comparative Example 3 was produced in the same manner as in Example 8 except for these differences.

Charge/Discharge Test

Using the batteries of Examples 8 to 10 and Comparative Example 3, a charge/discharge test was conducted under the same conditions as in Examples 1 to 7 and Comparative Examples 1 and 2.

For the batteries of Examples 8 to 10 and Comparative Example 3, DCR ratios, which are based on DCR values calculated by Equation (4), are shown in Table 2 along with x values determined by Equation (1). The DCR ratios are values normalized by setting the DCR value of the battery of Comparative Example 3 to 100.

TABLE 2

| | Coated cathode active material | BET specific surface area a [m$^2$/g] of coated cathode active material | VGCF-H/coated cathode active material (mass ratio) | Acetylene black/coated cathode active material (mass ratio c) | Total amount of conductive material/coated cathode active material (mass ratio) | x [%] | DCR ratio |
|---|---|---|---|---|---|---|---|
| Example 8 | Nb-NCA | 0.75 | 0 | 0.0048 | 0.0048 | 20.9 | 87 |
| Example 9 | Nb-NCA | 0.75 | 0.020 | 0.0013 | 0.0213 | 5.7 | 78 |
| Example 10 | Nb-NCA | 0.75 | 0.020 | 0.0030 | 0.0230 | 13.0 | 78 |
| Comp. Example 3 | Nb-NCA | 0.75 | 0.024 | 0 | 0.0240 | 0.0 | 100 |

Discussion

As can be seen from the results shown in Tables 1 and 2, the DCR ratio decreases when carbon black is disposed preferentially on the surface of the cathode active material by the cathode manufacturing method according to the present disclosure. This is presumably because the effective reaction area of the cathode active material is increased due to the increase in electron conduction paths formed on the surface of the cathode active material.

The data for Examples 1 to 10 shows that the DCR ratio is low when the value x determined by Equation (1) satisfies 5%≤x≤60%, indicating smooth conduction of lithium ions between the cathode active material and the solid electrolyte.

Cross-Sectional Observation of Cathode

Figure 8:
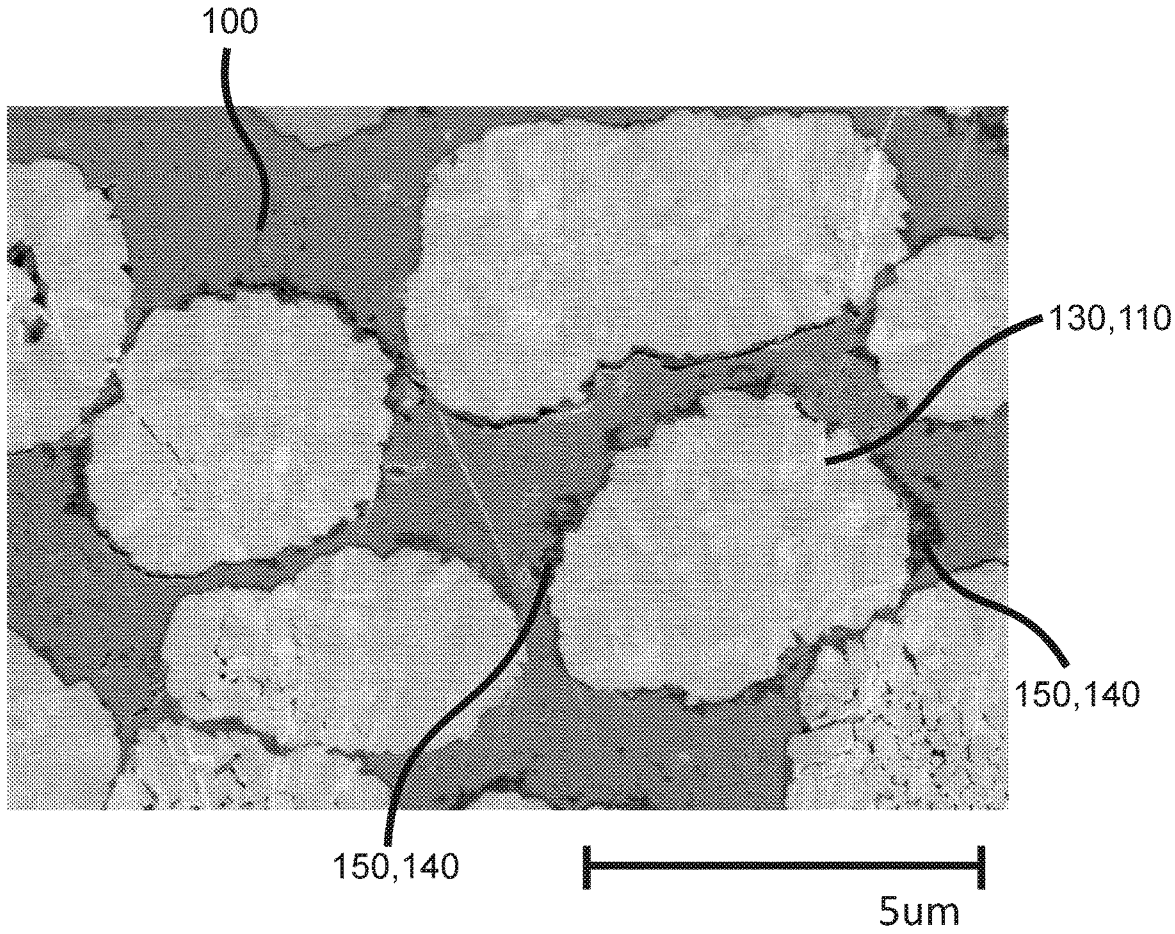
FIG. 8 is a cross-sectional SEM image of the cathode of Example 1.

FIG. 8 is a cross-sectional SEM image of the cathode of Example 1. The magnification of the image was 10,000 times. The above-described cathode production method was able to dispose carbon black preferentially on the surface of the cathode active material. Thus, when a cross-section of the cathode was observed using a scanning electron microscope, an area in which carbon black was concentrated was found between the cathode active material and the solid electrolyte. In particular, the area of the surface of the cathode active material, covered with carbon black, was larger than the area of the surface of the solid electrolyte, covered with carbon black. The same results were observed for the other Examples.

The battery of the present disclosure can be used, for example, as an all-solid-state lithium secondary battery.

What is claimed is:

1. A cathode comprising a mixture of a cathode active material, a solid electrolyte, and a conductive material, wherein the conductive material comprises carbon black having an average particle size of less than or equal to 100 nm, wherein when a cross-section of the cathode is observed using a scanning electron microscope, an area in which the carbon black is concentrated is found between the cathode active material and the solid electrolyte, and wherein x determined by the following Equation (1) satisfies 0%<x<100%:

$$x=(3\cdot c)/(4\cdot a\cdot b)\times 10^5 \quad (1)$$

where a is a BET (Brunauer-Emmett-Teller) specific surface area (m$^2$/g) of the cathode active material, b is the average particle size (nm) of the carbon black, and c is a ratio of a mass of the carbon black to a mass of the cathode active material in the cathode, and a density of the carbon black is 2.0 (g/cm$^3$).

2. The cathode according to claim 1, wherein x in Equation (1) satisfies 5%≤x≤60%.

3. The cathode according to claim 1, wherein x in Equation (1) satisfies 10%≤x≤50%.

4. The cathode according to claim 1, wherein x in Equation (1) satisfies 15%≤x≤40%.

5. The cathode according to claim 1, wherein a in Equation (1) satisfies 0<a≤1.5.

6. The cathode according to claim 1, wherein the conductive material further comprises a fibrous carbon material.

7. The cathode according to claim 1, wherein a ratio of a mass of the conductive material to the mass of the cathode active material is less than or equal to 0.03.

8. The cathode according to claim 1, wherein the carbon black has the average particle size of less than or equal to 25 nm.

9. The cathode according to claim 1, wherein the carbon black comprises acetylene black.

10. The cathode according to claim 1, wherein the solid electrolyte comprises at least one selected from the group consisting of a sulfide solid electrolyte and a halide solid electrolyte.

11. The cathode according to claim 1, wherein the cathode active material has a layered rock-salt structure.

12. The cathode according to claim 1, further comprising a coating layer which covers at least part of a surface of the cathode active material.

13. A battery comprising:

the cathode according to claim 1;

an anode; and an electrolyte layer provided between the cathode and the anode.

14. The battery according to claim 13, wherein the electrolyte layer comprises a sulfide solid electrolyte.

15. A method for manufacturing the cathode according to claim 1, comprising:

mixing the cathode active material and the carbon black to form a mixture; and further mixing the mixture comprising the cathode active material and the carbon black with the solid electrolyte.

* * * * *